(12) United States Patent
Lee et al.

(10) Patent No.: US 9,996,207 B2
(45) Date of Patent: Jun. 12, 2018

(54) APPARATUS AND METHOD FOR PROCESSING INPUT ON TOUCH SCREEN

(71) Applicant: Samsung Electronics Co. Ltd., Suwon-si, Gyeonggi-do (KR)

(72) Inventors: Joo-Hoon Lee, Yongin-si (KR); Sang-Hyeok Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/012,303

(22) Filed: Aug. 28, 2013

(65) Prior Publication Data
US 2014/0062929 A1 Mar. 6, 2014

(30) Foreign Application Priority Data
Aug. 29, 2012 (KR) ........................ 10-2012-0095081

(51) Int. Cl.
*G06F 3/041* (2006.01)
*G06F 3/046* (2006.01)
*G06F 3/0354* (2013.01)

(52) U.S. Cl.
CPC .......... *G06F 3/046* (2013.01); *G06F 3/03545* (2013.01)

(58) Field of Classification Search
CPC .............................. G06F 3/03545; G06F 3/041
See application file for complete search history.

(56) References Cited

U.S. PATENT DOCUMENTS

| 4,992,630 | A | 2/1991 | Mletzko |
| 5,225,637 | A | 7/1993 | Rodgers et al. |
| 5,749,070 | A | 5/1998 | Gourdol |
| 5,920,647 | A | 7/1999 | Nowlan et al. |
| 6,186,400 | B1 | 2/2001 | Dvorkis et al. |
| 6,559,858 | B1 | 5/2003 | Schneider et al. |
| 6,669,097 | B2 | 12/2003 | Dvorkis et al. |
| 6,697,506 | B1 | 2/2004 | Qian et al. |
| 8,077,774 | B1 | 12/2011 | Dawson |
| 8,217,918 | B2 | 7/2012 | Morag et al. |
| 2003/0136844 | A1 | 7/2003 | Dvorkis |
| 2003/0234892 | A1 | 12/2003 | Hu et al. |
| 2004/0046541 | A1 | 5/2004 | Hoffmann |

(Continued)

FOREIGN PATENT DOCUMENTS

| CN | 101470562 A | 7/2009 |
| JP | H08-137608 A | 5/1996 |

(Continued)

*Primary Examiner* — Jennifer Mehmood
*Assistant Examiner* — Carl Adams
(74) *Attorney, Agent, or Firm* — Jefferson IP Law, LLP (57) ABSTRACT

An apparatus and method for processing a touch screen input are provided. The method includes determining if an input from an electronic pen on a touch screen is a contact input or a hovering input, calculating a coordinate of the electronic pen on an input sensing panel of the touch screen by applying a first preset movement determination reference filter in the contact input and applying a second preset movement determination reference filter in the hovering input, the second preset movement determination reference filter having a wider range than that of the first movement determination reference filter in the hovering input, and outputting a coordinate signal according to the calculated coordinate.

16 Claims, 5 Drawing Sheets

(56) References Cited

U.S. PATENT DOCUMENTS

| | | |
|---|---|---|
| 2005/0041679 A1 | 2/2005 | Weinstein et al. |
| 2006/0082571 A1 | 4/2006 | McDaniel |
| 2008/0012835 A1 | 1/2008 | Rimon et al. |
| 2008/0111789 A1 | 5/2008 | Young et al. |
| 2009/0078474 A1 | 3/2009 | Fleck et al. |
| 2009/0078476 A1 | 3/2009 | Rimon et al. |
| 2009/0166100 A1* | 7/2009 | Matsubara .......... G06F 3/03545 178/18.06 |
| 2009/0167728 A1 | 7/2009 | Geaghan et al. |
| 2009/0289914 A1* | 11/2009 | Cho ..................... G06F 3/044 345/173 |
| 2010/0156807 A1* | 6/2010 | Stallings ............. G06F 3/04886 345/173 |
| 2010/0207904 A1 | 8/2010 | Kolmykov-Zotov et al. |
| 2011/0007021 A1 | 1/2011 | Bernstein et al. |
| 2011/0155479 A1 | 6/2011 | Oda et al. |
| 2011/0279397 A1* | 11/2011 | Rimon .................. G06F 3/044 345/173 |
| 2012/0169663 A1 | 7/2012 | Kim et al. |
| 2012/0182254 A1 | 7/2012 | Jang et al. |
| 2013/0015865 A1* | 1/2013 | Izumi .................... G06F 3/044 324/679 |

FOREIGN PATENT DOCUMENTS

| | | |
|---|---|---|
| JP | 2001-043006 A | 2/2001 |
| JP | 2009-093641 A | 4/2009 |
| JP | 2011-138180 A | 7/2011 |
| KR | 10-2012-0079595 A | 7/2012 |
| WO | 2011-023225 A1 | 3/2011 |

\* cited by examiner

APPARATUS AND METHOD FOR PROCESSING INPUT ON TOUCH SCREEN

PRIORITY

This application claims the benefit under 35 U.S.C. § 119(a) of a Korean patent application filed on Aug. 29, 2012 in the Korean Intellectual Property Office and assigned Serial No. 10-2012-0095081, the entire disclosure of which is hereby incorporated by reference.

BACKGROUND OF THE INVENTION

1. Field of the Invention

The present invention relates to a touch screen input scheme. More particularly, the present invention relates to an apparatus and method for processing a touch screen input using an electronic pen such as a stylus pen.

2. Description of the Related Art

Recent display devices have widely employed a touch screen input scheme in which a user directly touches a screen using a finger or an electronic pen to perform inputs. Such a touch screen input scheme has been mainly employed in a portable terminal such as a smart phone, a portable phone, a notebook computer, an all-in-one Personal Computer (PC), a tablet PC, a Portable Multimedia Player (PMP), and the like. The touch screen input scheme is an input device which allows a user to touch a certain portion of a display screen to input information instructed by the user, and provides an intuitive and convenient user interface. In particular, a touch input scheme using a pen is effective for designation of precision coordinate input rather than a touch input using a finger. Therefore, the touch input scheme using a pen is suitable to perform graphic functions using a CAD program.

The touch screen input scheme is referred to as a digitizer or an Electric Graphic Input Panel (EGIP), which is generally classified into a resistive scheme, a capacitive scheme, an Electro Magnetic Resonance (EMR) scheme (or an electromagnetic scheme), and the like, according to a method of detecting a position instructed by a user.

The resistive scheme senses a position pushed by a touch using a change of electric current based on a direct voltage that is applied to a touch screen. The resistive scheme senses a contact of a finger or an electronic pen such as a stylus pen when the finger or the electronic pen comes in contact with and applies a pressure to two thin conduction layers of the touch screen.

The capacitive scheme senses an input using capacitive coupling in a state that an alternative voltage is applied to a touch screen, in which a sensed object must be a conductor and more than a predetermined area must vary for the capacitance to be sensed.

On the other hand, the EMR scheme uses a digitizer sensor substrate in which loop coils are arranged. Accordingly, when a user moves an electronic pen, the electronic pen is operated by alternative signals to generate a magnetic resonance, which induces signals in coils of the digitizer sensor substrate. A touch screen can detect a position of the electronic pen through the signals induced in the coils.

According to the EMR scheme, since the position of the electronic pen is identified by sensing an electrical change caused by the contact of the pen with the digitizer sensor substrate having a plurality of coils mounted thereon, it is unnecessary to arrange the sensor substrate on a front surface of a display module, which is different way from the resistive scheme noted above. Accordingly, it is possible to arrange the sensor substrate on a rear surface of the display module. On the other hand, a multiple input device including a digitizer input device employing the EMR scheme and a touch input device capable of sensing a contact of a user's finger can be provided to portable terminals.

Korean Patent Publication No. 10-2012-0079595, entitled to the present applicant on Jul. 13, 2012, discloses an apparatus and method for correcting an input error of an input device, in which a technique of a touch screen input scheme is described.

On the other hand, a technique which is able to distinguish between a direct contact state of an electronic pen and a non-contact state of the electronic pen, i.e. a hovering state for a touch screen is recently provided. However, a more effective input process is required.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is provide an apparatus and method for processing an input on a touch screen, which is able to perform a more effective input process by distinguishing between a contact state of a pen and a hovering state for the touch screen.

In accordance with an aspect of the present invention, an apparatus for processing an input on a touch screen is provided. The apparatus includes an input sensing panel which receives a contact input and a hovering input of an electronic pen on a touch screen, and an input sensing controller which processes an input sensing signal provided from the input sensing panel and generates a coordinate signal indicating an input location on the touch screen, and which processes the input sensing signal according to the hovering input via a movement determination reference filter set to have a wider sensing range in the hovering input rather than in the contact input.

In one example, the movement determination reference filter is set to have a different sensing range in different regions of the input sensing panel on which the electronic pen is located, according to the contact input and the hovering input.

In another example, the different regions of the input sensing panel include at least a center region, an edge region and a corner region, and the movement determination reference filter is set so that the corner region, the edge region and the center region respectively have a wider sensing range in listed order according to the contact input and the hovering input.

In accordance with another aspect of the present invention, a method of processing an input on a touch screen is provided. The method includes determining if an input from an electronic pen on a touch screen is a contact input and a hovering input, calculating a coordinate of the electronic pen on an input sensing panel of the touch screen by applying a first preset movement determination reference filter in the contact input and applying a second preset movement determination reference filter in the hovering input, the second preset movement determination reference filter having a wider range than that of the first movement determination reference filter, and outputting a coordinate signal according to the calculated coordinate.

In one example, the first and second movement determination reference filters are set to have a different sensing range in different regions of the input sensing panel on which the electronic pen is located.

In another example, the different regions of the input sensing panel include at least a center region, an edge region and a corner region, and the first and second movement determination reference filters are set so that the corner region, the edge region and the center region respectively have a wider sensing range in listed order.

In yet another example, the coordinate signal includes coordinate information of X axis and Y axis on the input sensing panel and information to determine the contact input or the hovering input.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and/or other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the spirit and scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
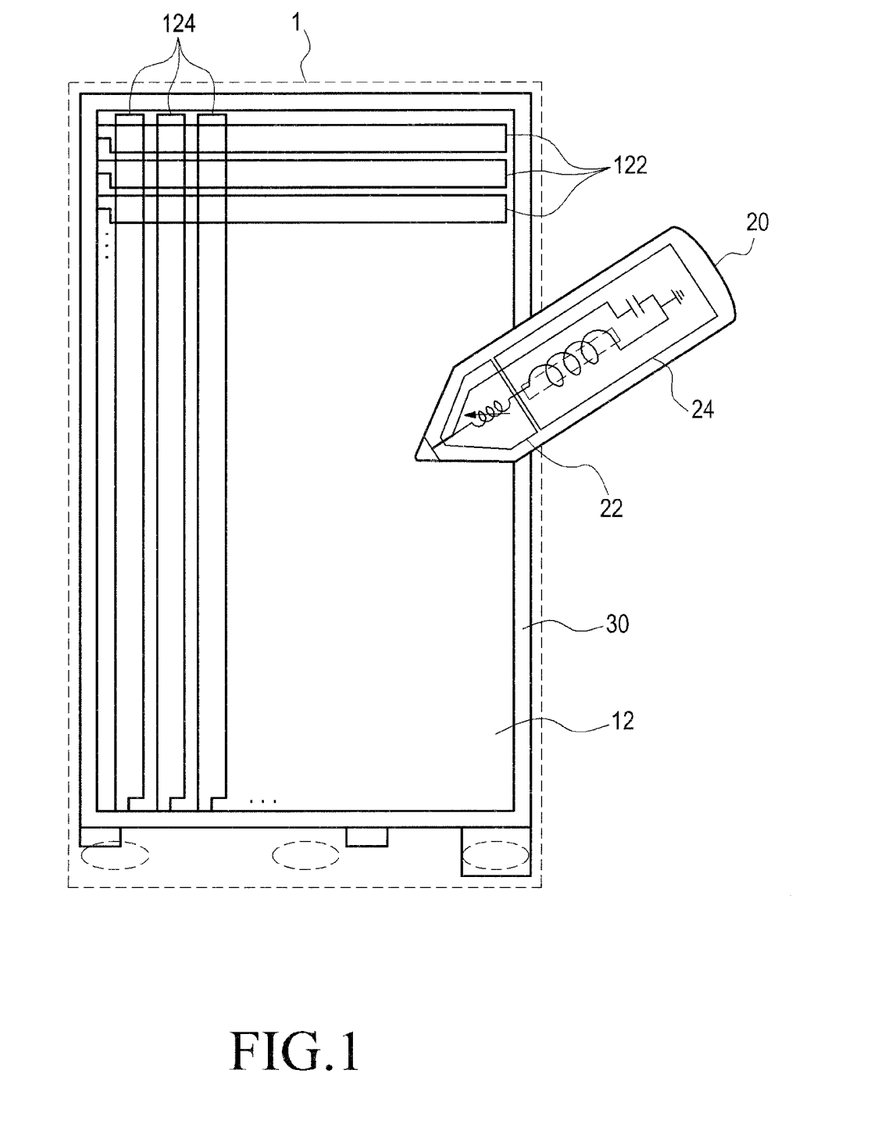
FIG. 1 illustrates an example input sensing panel and electronic pen of a touch screen input apparatus according to an exemplary embodiment of the present invention.

FIG. 1 illustrates an example input sensing panel of a touch screen input apparatus and an electronic pen according to an exemplary embodiment of the present invention.

Referring to FIG. 1, an example of an Electro Magnetic Resonance (EMR) type touch screen is illustrated such that a structure or a size is simplified and exaggerated for convenience. Further, the touch screen input apparatus shown in FIG. 1 can be applied to, for example, a portable terminal 1 that is provided with an input sensing panel 12 for sensing an input of a contact and a non-contact (e.g., hovering) state of an electronic pen 20 such as stylus pen.

The input sensing panel 12 may be referred to as a digitizer sensor substrate, an EMR sensing panel, etc. In the input sensing panel 12, a plurality of loop coil patterns 122 and 124 are configured to intersect with each other in a horizontal axis and a vertical axis. An electronic pen 20 and the input sensing panel 12 together are configured to generate a magnetic field having a predetermined resonance frequency. The loop coil patterns 122 on the horizontal axis can be formed in a partially overlapped condition. Likewise, the loop coil patterns 124 on the vertical axis also can be formed in a partially overlapped condition. In the input sensing panel 12, the plurality of loop coil patterns 122 and 124 are sequentially selected and repeatedly perform an operation of applying an alternative current of a resonance frequency in order to form a magnetic field and detect a magnetic field of the resonance frequency formed in the electronic pen 20.

On the other hand, the electronic pen 20 includes an inductor coil and a main resonance circuit 24, which includes an LC resonance circuit formed with a capacitor, in order to input coordinates on the input sensing panel 12. The inductor coil generates an electric current due to the magnetic field formed in the input sensing panel 12 and transmits the generated electric current to the capacitor of the LC resonance circuit. Then, the capacitor is charged with the electric current transmitted from the inductor coil, and discharges the electric current to the coil. As a result, the magnetic field is discharged to the coil.

Therefore, the plurality of loop coils 122 and 124 of the input sensing panel 12 can detect the magnetic field discharged by the electronic pen 20, and determine whether the electronic pen 20 is adjacent to any position of the touch screen. More particularly, when the user makes the electronic pen 20 contact with or be hovering near the touch screen, the plurality of loop coils 122 and 124 respectively sense the magnetic field generated by the electronic pen 20 and output an inductive current that is caused by the magnetic field as an input sensing signal. The plurality of the loop coils 122 and 124 respectively output the input sensing signal having an increasingly greater intensity as the electronic pen 20 approaches the loop coils 122 and 124. The accurate position of the electronic pen 20 can be identified by using the input sensing signal.

Further, the electronic pen 20 is provided with a variable resonance circuit 22 that varies the resonance frequency of the main resonance circuit 24 to generate a different signal according to the contact state or the hovering state on the touch screen. The variable resonance circuit 22 includes a variable inductor component or variable capacitor component of which the capacitance value or the inductance value is variable depending on a contact pressure when a tip of the electronic pen comes into contact with the touch screen. The variable values of the variable inductor component and the variable capacitor component can be set to a relatively fine value.

The resonance frequency of the main resonance circuit 24 is affected by the variable resonance circuit 22 according to a contact state or hovering state of the electronic pen 20 on the touch screen. Accordingly, the input sensing panel 12 detects the variation of the resonance frequency to determine whether the electronic pen 20 is in contact with the touch screen or is hovering over the touch screen.

On the other hand, the input sensing panel 12 may have, at a lower portion thereof, an isolation layer for isolating a magnetic field that flows in the input sensing panel 12 from another circuit.

Further, the touch screen which is provided with a display panel including the input sensing panel 12, an Active Matrix Organic Light Emitting Diode (AMOLED) display, and the like, is mounted on a bracket 30 and rigidly fixed to be protected from an external impact. Of course, the bracket 30 has a suitable shape to protect circuits, equipment, external case, and the like, of the corresponding portable terminal 1 from the external impact.

Figure 2:
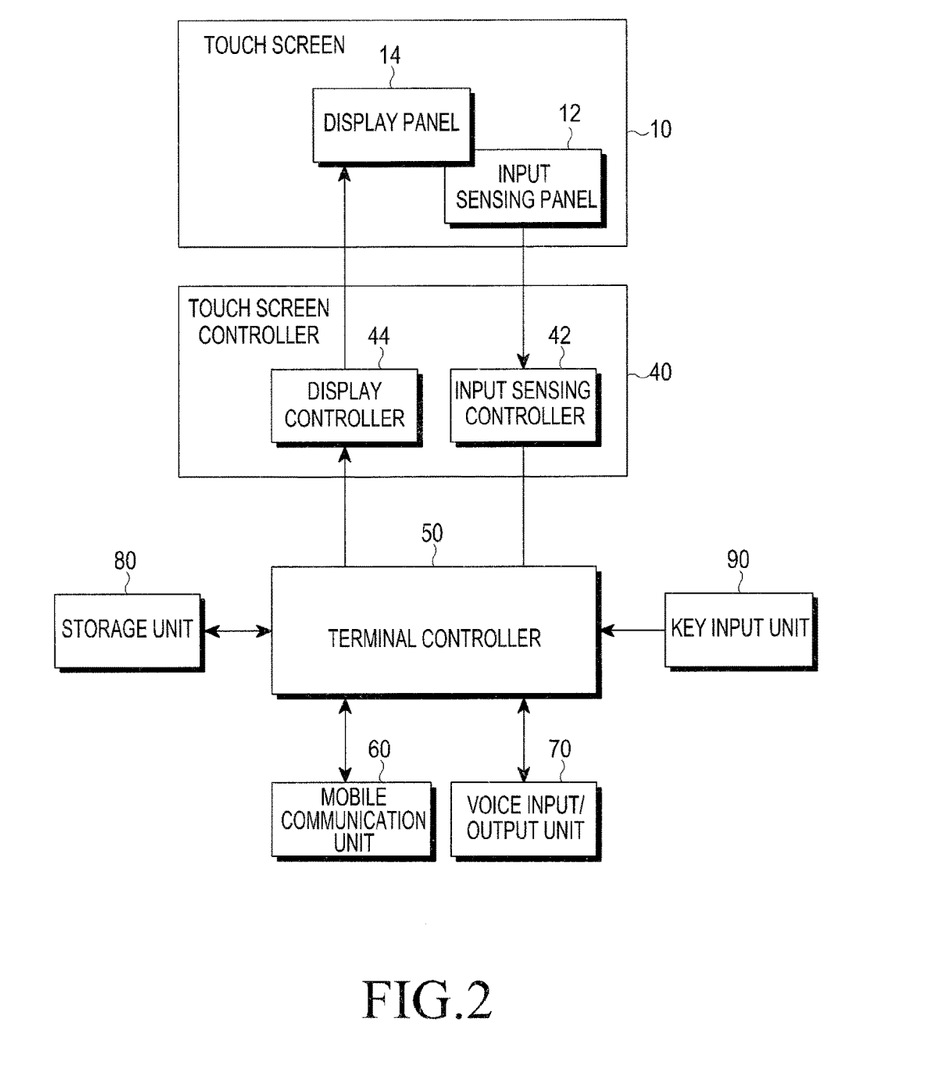
FIG. 2 is a block diagram of a portable terminal having a touch screen input apparatus according to an exemplary embodiment of the present invention.

FIG. 2 is a block diagram of a portable terminal having a touch screen type input apparatus according to an exemplary embodiment of the present invention.

Referring to FIG. 2, the portable terminal displays various images according to the operation conditions of the corresponding portable terminal, an execution of applications in the portable terminal, and services in the portable terminal. Further, the portable terminal includes the touch screen 10 for sensing a touch input such as a contact state or a hovering state of the electronic pen on a display screen in order to provide a user with a user interface corresponding to an operation state or service. The touch screen 10 includes a display panel 14 such as an AMOLED display and an input sensing panel 12 such as an EMR sensing panel.

A touch screen controller 40 includes a display controller 44 for controlling an image display of the display panel 14 of the touch screen 10, and an input sensing controller 42 for processing an input sensing signal provided from the input sensing panel 12 of the touch screen 10. The input sensing controller 42 receives and processes an analog input sensing signal (e.g., a coordinate signal detected by a hardware) which is provided from the input sensing panel 12 and corresponds to an input of the electronic pen, and converts the received analog signal into a coordinate signal (e.g., a coordinate signal processed by a software), for example, a coordinate signal of X and Y coordinates. Then, the input sensing controller 42 transmits the coordinate signal to a terminal controller 50. The coordinate signal provided by the input sensing controller 42 can include a signal (for example, a Z coordinate) for a contact state or a hovering state of the electronic pen.

The terminal controller 50 provides image data to the display controller 44 of the touch screen controller 40 in order to display the image data. Further, the terminal controller 50 operates a corresponding user interface in response to the coordinate signal corresponding to the input of the electronic pen provided from the input sensing controller 42 of the touch screen controller 40. The terminal controller 50 also performs an execution of a predetermined operation of a corresponding application or an operation of changing an execution condition of a corresponding service.

Furthermore, the portable terminal includes a key input unit 90 which has a plurality of keys (hard keys or soft keys) that are mechanically mounted at a certain place on a front surface or on a side thereof to allow a user to input a signal corresponding to an execution of a predetermined operation, a mobile communication unit 60 which includes an antenna for a mobile communication and performs a wireless signal processing operation for the mobile communication to communicate with a communication network, a voice input/output unit 70 which includes a speaker and a microphone that receives a user's voice or outputs audible sounds to the user during a telephone call as a mobile communication function and outputs sounds correspond to various operations or sounds corresponding various digital audio and video content, and a storage unit 80 which stores an operation program with relation to operations of the terminal controller 50, various application programs, related content, and image data, as well as the touch screen content.

The terminal controller 50 controls each functional unit of the portable terminal and controls an entire operation of the portable terminal.

In addition, the portable terminal includes other functional units such as a power supply unit having a chargeable battery (not shown), a camera unit (not shown), a GPS unit (not shown) and a vibration unit (not shown). Of course, it is noted that the portable terminal may further include any functional unit applicable to typical portable terminals.

The touch screen controller 40 can be included in the terminal controller 50 in another exemplary embodiment of the present invention, and also it is possible to configure the display panel 14 and the display controller 44 by separating them from the touch screen 10 and the touch screen controller 40.

Figure 3:
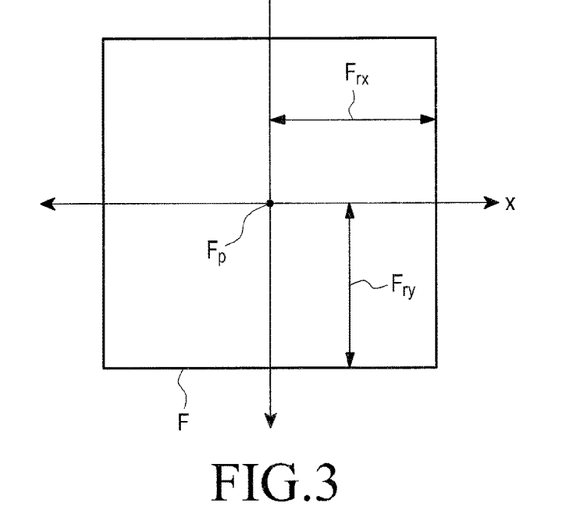
FIG. 3 illustrates a movement determination reference filter for determining the absence or presence of a movement of the electronic pen according to an exemplary embodiment of the present invention.

FIG. 3 illustrates a movement determination reference filter for determining the absence or presence of a movement of the electronic pen according to an exemplary embodiment of the present invention.

Referring to FIG. 3, an operation of the input sensing controller 42 of the touch screen controller 40 will be described. The input sensing controller 42 determines the absence or presence of movement of the electronic pen by using a movement determination reference filter F (referred to as a move filter or a box filter) according to the exemplary embodiment of the present invention. That is, the input sensing signal for the electronic pen is processed in the input sensing panel 12 of the touch screen to determine movement of the electronic pen if the movement exceeds a predetermined reference distance of $\pm F_{rx}$ on the X axis or a predetermined reference distance of $\pm F_{ry}$ on the Y axis with respect to the present coordinate $F_p$.

More particularly, the input sensing signals, for example, more than 130 times per second, can be provided to the input sensing panel 12, and the coordinates corresponding to the input sensing signals have a resolution of 10 µm. In this example, the input sensing controller 42 is able to generate coordinate signals corresponding to the input sensing signals provided from the input sensing panel 12. However, the intensity of the input sensing signals or noise is different at each region on the input sensing panel 12. Further, the intensity of the input sensing signals varies according to a contact state or a hovering state of the electronic pen. In this case, when the coordinate signals are generated in response to the input sensing signals, inaccurate or unstable coordinate signals may be generated.

Figure 4:
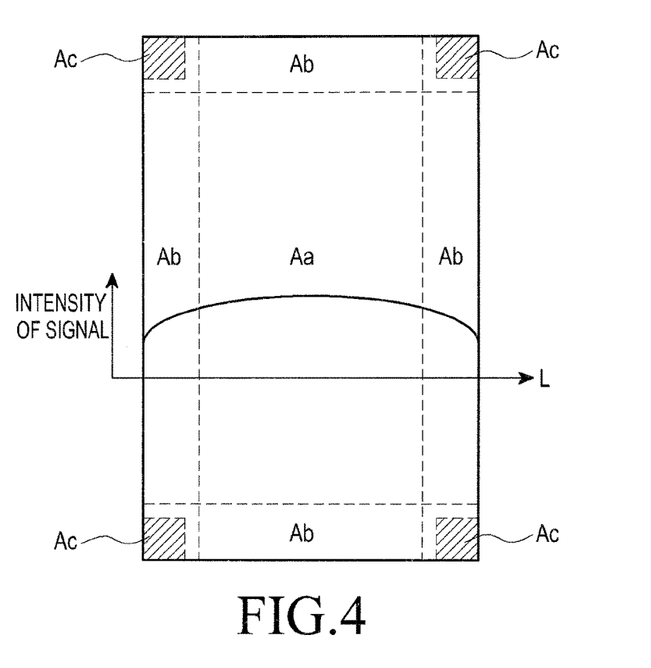
FIG. 4 illustrates an intensity of the input sensing signal of the electronic pen at each region on the touch screen according to an exemplary embodiment of the present invention.

FIG. 4 illustrates an intensity of the input sensing signals of the electronic pen at each region on the touch screen according to an exemplary embodiment of the present invention.

Referring to FIG. 4, the intensity of the input sensing signals is strong at a center region Aa on the input sensing panel 12, while the intensity of the input sensing signals is small at an edge region Ab. The intensity difference of the signals is induced since the input sensing signals of the edge region Ab are affected by the bracket and the like to which the input sensing panel is attached and fixed. Further, it is noted that the intensity of the input sensing signals becomes smallest at corner regions Ac of the input sensing panel 12.

Figure 5A:
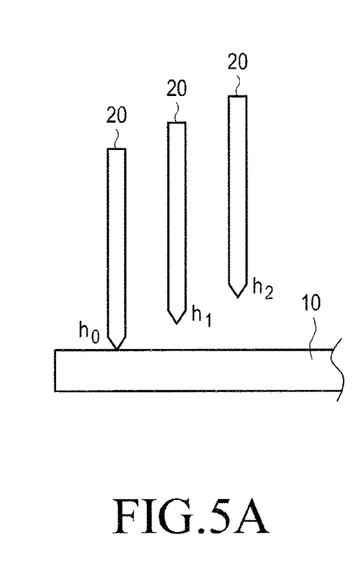
FIGS. 5A and 5B are diagrams that illustrate the intensity of an input sensing signal for each height of the electronic pen on the touch screen according to an exemplary embodiment of the present invention.
Figure 5B:
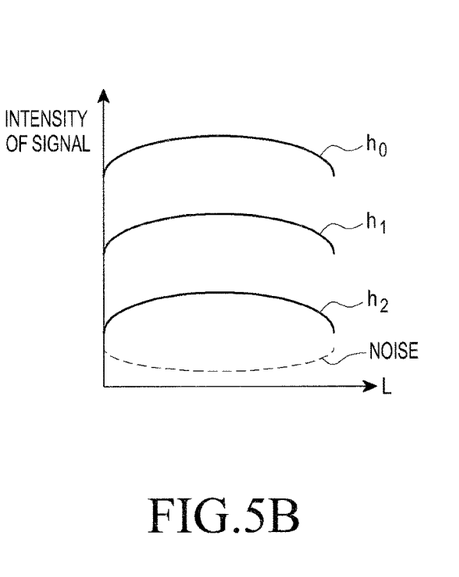

FIGS. 5A and 5B are diagrams that illustrate the intensity of the input sensing signals at each height of the electronic pen on the touch screen according to an exemplary embodiment of the present invention.

FIG. 5A shows an example of the electronic pens having different heights over the touch screen and FIG. 5B shows an example of signals which have intensity corresponding to each height of the electronic pens shown in FIG. 5A. As shown in FIGS. 5A and 5B, the intensity of the input sensing signal is the greatest when the height of the electronic pen 20 on the touch screen is zero at $h_0$, i.e., the electronic pen 20 is in contact with the touch screen. Further, the intensity of the input sensing signal decreases as the height of the electronic pen 20 increases in relation to the touch screen. That is, as a distance between the electronic pen 20 and the touch screen 10 increases, such as the electronic pen 20 is contacting the touch screen at $h_0$ to when it is hovering at $h_1$ or $h_2$, the intensity of the input sensing signal decreases respectively.

As described above, in a case that there is no consideration that the input sensing signal is weak, jitter may appear in the coordinate signal corresponding to the input sensing signal.

Referring back to FIG. 3, it is determined by using a predetermined range of the movement determination reference filter F that the electronic pen is moved in a region of the input sensing panel when the input sensing signal corresponding to the movement of the electronic pen is out of a range of the movement determination reference filter F on a present coordinate, and a coordinate signal is generated. The movement determination reference filter F is set to have a predetermined reference distance of $\pm F_{rx}$ on the X axis and a predetermined reference distance of $\pm F_{ry}$ on the Y axis around the present coordinate $F_p$.

In a case of setting the movement determination reference filter F, however, when the input sensing signal has a weak intensity is set as a reference in consideration of only the intensity of the input sensing signal, the movement determination reference filter F is set to a very wide range. Accordingly, the coordinate quality such as an accuracy of the coordinate can be reduced.

Accordingly, a method according to an exemplary embodiment of the present invention distinguishes between a contact state of the electronic pen and a hovering state of the electronic pen. In the contact state, the intensity of the input sensing signal is large and a quality of the coordinates is considered important. On the other hand, in a hovering state of the electronic pen on the touch screen, the intensity of the input sensing signal is small and a quality of coordinates is considered unimportant and, thus, the method differently applies the movement determination reference filter to be adopted to the corresponding state. That is, in an execution of a 'drawing' application and the like by using the electronic pen, an exemplary embodiment of the present invention variably sets the movement determination reference filter to sense a fine variation of the coordinate corresponding to the movement of the electronic pen in the contact state and improve the jitter appearance of the coordinate in the hovering state. In addition, in this case, the movement determination reference filter is variably set in consideration of an intensity difference of the input sensing signal at each region of the touch screen.

Figure 6:
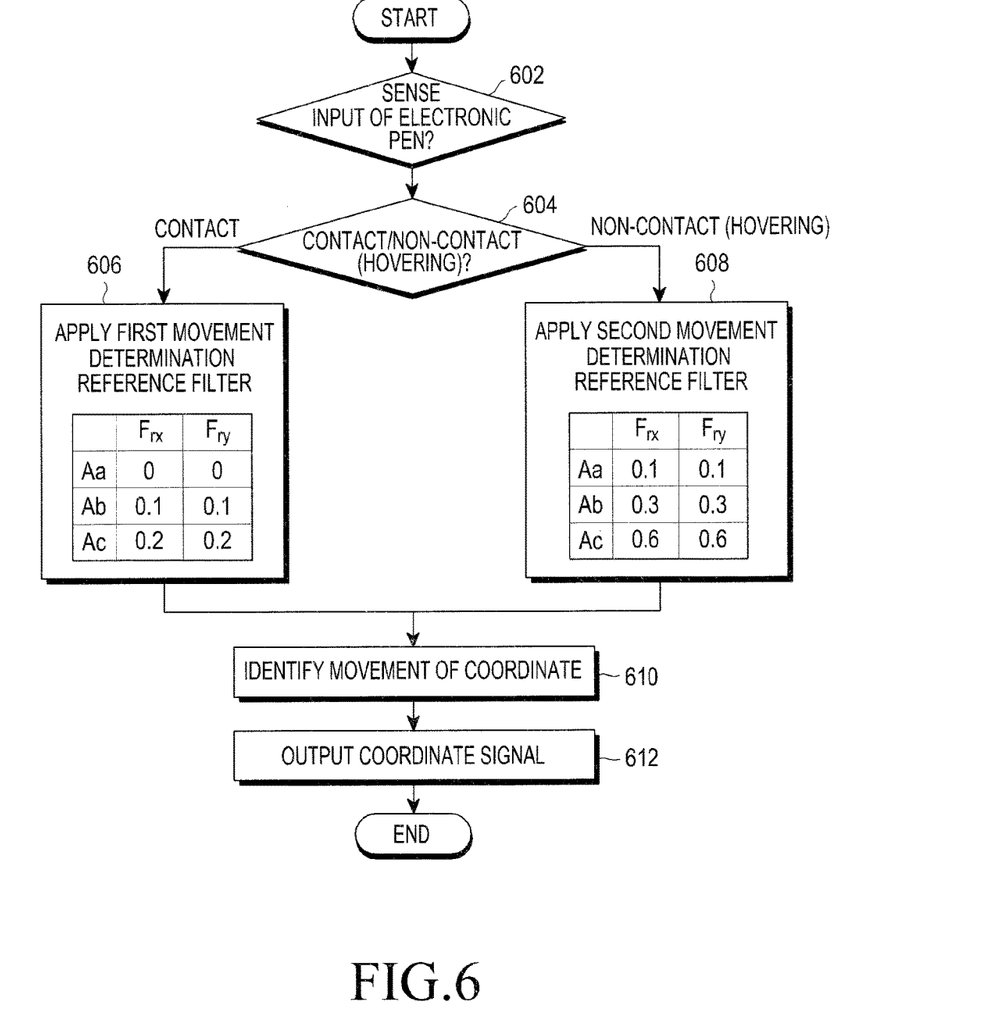
FIG. 6 is a flowchart of a method for processing the touch screen input according to an exemplary embodiment of the present invention.

FIG. 6 is a flowchart illustrating a method of processing the touch screen input according to an exemplary embodiment of the present invention.

Referring to FIG. 6, the method of processing the touch screen input can be performed via the input sensing controller 42 in the touch screen controller 40 shown in FIG. 2. Initially, in step 602, the input sensing controller 42 identifies output signals of the input sensing panel 12, and determines whether an input of the electronic pen is sensed on the touch screen. If the input of the electronic pen is sensed, the input sensing controller 42 proceeds to step 604. In step 604, it is determined whether the electronic pen is in a contact state or in a non-contact (i.e., hovering) state on the touch screen. If the electronic pen is in the contact state, the input sensing controller 42 proceeds to step 606. Otherwise, if the electronic pen is in the hovering state, the input sensing controller 42 proceeds to step 608.

In step 606, the first movement determination reference filter predetermined to correspond to the contact state is applied to the output signals. As shown in FIG. 4, a reference distance $\pm F_{rx}$ on the X axis and a reference distance $\pm F_{ry}$ on the Y axis in the first movement determination reference filter are set to zero in the center region Aa on the input sensing panel 12. In this case, the first movement determination reference filter does not perform the filtering operation and generates a coordinate signal to correspond to the input sensing signal itself. Also, with relation to an edge region Ab of the input sensing panel 12, all of the reference distance $\pm F_{rx}$ of the X axis and the reference distance $\pm F_{rx}$ of the Y axis of the first movement determination reference filter are set to 0.1 millimeters (mm). The edge region Ab is set to a region in a range of 15 mm from each of an upper portion, a lower portion and both side portions of the input sensing panel 12, except for the corner region Ac. With relation to the corner region Ac of the input sensing panel 12, all of the reference distance $\pm F_{rx}$ of the X axis and the reference distance $\pm F_{ry}$ of the Y axis of the first movement determination reference filter are set to 0.2 mm. In this case, the corner region Ac is set to a region in a range of 5 mm×5 mm in horizontal and vertical directions from the corner. In step 606, the input sensing controller 42 applies the first movement determination reference filter, and proceeds to step 610.

On the other hand, in step 608, a second movement determination reference filter, which is preset in a wider range than the first movement determination filter and corresponds to the non-contact (hovering) state, is applied. For example, a reference distance $\pm F_{rx}$ on the X axis and a reference distance $\pm F_{rx}$ on the Y axis in the second movement determination reference filter are set to 0.1 mm in the center region Aa on the input sensing panel 12. Also, with relation to an edge region Ab of the input sensing panel 12, all of the reference distance $\pm F_{rx}$ of the X axis and the reference distance $\pm F_{ry}$ of the Y axis of the second movement determination reference filter are set to 0.3 mm. With relation to the corner region Ac of the input sensing panel 12, all of the reference distance $\pm F_{rx}$ of the X axis and the reference distance $\pm F_{ry}$ of the Y axis of the second movement determination reference filter are set to 0.6 mm. In step 608, the input sensing controller 42 applies the second movement determination reference filter, and proceeds to step 610.

In step 610, the input sensing controller 42 identifies the absence or presence of the coordinate movement of the electronic pen on the input sensing panel by using the presently applied movement determination reference filter, i.e., the first or second movement determination reference filter. Then, in step 612, coordinate signals are output. At this time, when no coordinate movement of the electronic pen is identified, the coordinate signals cannot be output in step 612. The coordinate signals can include the coordinates of X and Y axes, and also can include the coordinate of a Z axis in the hovering state. In this case, the coordinate of the Z axis indicating the hovering state has a value of zero or one to indicate the absence or present of the hovering state.

In the operation illustrated in FIG. 6, the input sensing signal (i.e., coordinate information) provided from hardware in step 606 passes through the first or second movement determination reference filter in step 606 or in step 608 according to the contact state of the electronic pen. In this case, a coordinate event is generated in step 610. In a case that the input sensing signal is filtered by the first or second movement determination reference filter, it can be determined that a coordinate event is not generated.

The movement determination reference filter can be adopted for each of the contact state and the hovering state of the electronic pen. Therefore, in a case that the resolution of the coordinate is important, i.e., in the contact state where the jitter of the coordinate is small due to a high Signal-to-Noise Ratio (SNR), the filtering of the coordinate is not performed. To the contrary, when a small change is present in comparison with the present coordinate, an operation of processing the coordinate event is performed. On the other hand, when the stability of the coordinate is important, i.e. in the state where the jitter of the coordinate is great due to a low SNR, an operation of processing the coordinate event is performed only when a change of the coordinate is larger than a predetermined value. In this case, the filtering reference value is differently set for each region with a different SNR on the touch screen.

As described above, since the touch screen input processing scheme distinguishes the contact and hovering states of the electronic pen for the touch screen, it is possible to effectively process input. In particular, it is possible to stably determine the absence or presence of the movement of the pen.

The configuration and operation of the apparatus and method for processing a touch screen input according to the exemplary embodiment of the present invention can be achieved as described. It will be appreciated that the exemplary embodiments of the present invention may be implemented in the form of hardware, software, or a combination of hardware and software. Any such software may be stored in a volatile or non-volatile storage device such as a Read-Only Memory (ROM), or in a memory such as a Random Access Memory (RAM), a memory chip, a memory device or a memory integrated circuit, or in a non-transitory storage medium which is magnetically recordable and simultaneously is readable by a machine (for example, a computer), regardless of whether the software can be deleted or rewritten.

Further, while the present invention has been described with reference to a certain exemplary embodiment thereof, it will be understood that various changes may be made therein without departing from the scope of the present invention.

For example, it is described that the movement determination reference filter is differently set according to the contact state or hovering state of the electronic pen. However, in another exemplary embodiment of the present invention, it is possible to set the movement determination reference filter to a wide operation range so that the movement determination reference filter operates in a wider range according to the intensity of the input sensing signal, i.e. when the intensity of the input sensing signal is weak in the hovering state of the electronic pen. In this case, the movement determination reference filter is differently set to correspond to the height of the electronic pen in the hovering state.

In the aforementioned description, it is described that the region on the touch screen is distinguished into the center region, the edge region and the corner region. However, the region on the touch screen can be distinguished into several regions, and also the edge region can be divided into left and right edge regions, and upper and lower regions.

Further, in the description, it is described that the reference distances $\pm F_{rx}$, $\pm F_{ry}$ and $\pm F_{rz}$ of the X axis, Y axis and Z axis in the movement determination reference filter are equal to one another. However, it will be appreciated that the reference distances $\pm F_{rx}$ and $\pm F_{rx}$ of the X axis and Y axis in the movement determination reference filter can be set to be different from each other in each region on the touch screen as well as according to the application or service to be executed.

Furthermore, in the description, it is described that the methods can be applied to the EMR type electronic pen, the input sensing panel, and the like. In addition, the methods can distinguish the contact and hovering state of the electronic pen, and also can be applied to any scheme capable of generating the coordinate signal using the intensity of the input sensing signal of the electronic pen.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A touch screen input apparatus, the apparatus comprising:
   an input sensing panel configured to receive at least one of a contact input or a hovering input of an electronic pen on a touch screen; and
   an input sensing controller configured to:
   process an input sensing signal provided from the input sensing panel,
   determine whether the input sensing signal is one of the contact input or the hovering input,
   generate a coordinate signal indicating an input location on the touch screen, and
   process, when the input sensing signal is the hovering input, the input sensing signal according to a movement determination reference filter for the hovering input set to have a wider reference range for detecting movement parallel to a face of the touch screen in the hovering input rather than in the contact input, wherein the movement determination reference filter has a variable reference range for determining whether the electronic pen is moved to a first coordinate from a second coordinate on the touch screen while receiving the hovering input of the electronic pen, and wherein, when the electronic pen moves within the variable reference range, the coordinate signal is not generated.

2. The apparatus of claim 1, wherein the movement determination reference filter is set to have a different reference range in different regions of the input sensing panel on which the electronic pen is located, according to the contact input and the hovering input.

3. The apparatus of claim 2, wherein the different regions of the input sensing panel include at least a center region, an edge region and a corner region, and the movement determination reference filter is set so that the corner region, the edge region and the center region respectively have a wider reference range in listed order according to the contact input and the hovering input.

4. The apparatus of claim 3, wherein the input sensing panel is an Electro Magnetic Resonance (EMR) type sensing panel.

5. The apparatus of claim 2, wherein the input sensing panel is an Electro Magnetic Resonance (EMR) type sensing panel.

6. The apparatus of claim 1, wherein the input sensing controller is configured to determine if an input sensing signal corresponds to the hovering input or the contact input.

7. The apparatus of claim 6, wherein the input sensing panel is an Electro Magnetic Resonance (EMR) type sensing panel.

8. The apparatus of claim 1, wherein the input sensing panel is an Electro Magnetic Resonance (EMR) type sensing panel.

9. A method of processing a touch screen input, the method comprising:

determining if an input from an electronic pen on a touch screen is a contact input or a hovering input;

calculating a coordinate of the electronic pen on an input sensing panel of the touch screen by applying a first preset movement determination reference filter in the contact input and applying a second preset movement determination reference filter in the hovering input when the input from the electric pen is the hovering input, the second preset movement determination reference filter having a wider reference range for detecting movement parallel to a face of the touch screen than that of the first movement determination reference filter; and outputting a coordinate signal according to the calculated coordinate, wherein each of the first and second preset movement determination reference filter has a first and second reference range for determining whether the electronic pen is moved to a first coordinate from a second coordinate on the touch screen while receiving the hovering input of the electronic pen, and wherein, when the electronic pen moves within the first and second reference range, the coordinate signal is not generated.

10. The method of claim 9, wherein the first and second movement determination reference filters are set to have a different reference range in different regions of the input sensing panel on which the electronic pen is located.

11. The method of claim 10, wherein the different regions of the input sensing panel include at least a center region, an edge region and a corner region, and the first and second movement determination reference filters are set so that the corner region, the edge region and the center region respectively have a wider reference range in listed order.

12. The method of claim 11, wherein the coordinate signal includes coordinate information of X axis and Y axis on the input sensing panel and information for determining the contact input or the hovering input.

13. The method of claim 10, wherein the coordinate signal includes coordinate information of X axis and Y axis on the input sensing panel and information for determining the contact input or the hovering input.

14. The method of claim 9, wherein the coordinate signal includes coordinate information of X axis and Y axis on the input sensing panel and information for determining the contact input or the hovering input.

15. The method of claim 9, wherein the determining of if the input from the electronic pen on the touch screen is the contact input or the hovering input comprises analyzing a frequency of an input sensing signal from the input sensing panel.

16. A non-transitory computer-readable storage medium storing instructions that, when executed, cause at least one processor to perform the method of claim 9.

* * * * *